United States Patent
Olijve et al.

(10) Patent No.: US 11,725,118 B2
(45) Date of Patent: Aug. 15, 2023

(54) METHOD FOR THE PREPARATION OF GELATIN HYDROLYSATE HAVING A LOW ENDOTOXIN CONTENT

(71) Applicant: Rousselot BVBA, Ghent (BE)

(72) Inventors: Joseph Hubertus Olijve, Ghent (BE); Eline Bakhuizen, Ghent (BE); Paul Stevens, Ghent (BE)

(73) Assignee: Rousselot BVBA, Ghent (BE)

( * ) Notice: Subject to any disclaimer, the term of this patent is extended or adjusted under 35 U.S.C. 154(b) by 66 days.

(21) Appl. No.: 16/766,654

(22) PCT Filed: Nov. 22, 2018

(86) PCT No.: PCT/EP2018/082238
§ 371 (c)(1),
(2) Date: May 22, 2020

(87) PCT Pub. No.: WO2019/101864
PCT Pub. Date: May 31, 2019

(65) Prior Publication Data
US 2020/0362201 A1    Nov. 19, 2020

(30) Foreign Application Priority Data
Nov. 23, 2017 (EP) ................................. 17203341

(51) Int. Cl.
C09H 3/02 (2006.01)
C08L 89/06 (2006.01)
A61K 8/65 (2006.01)

(52) U.S. Cl.
CPC ............... *C09H 3/02* (2013.01); *C08L 89/06* (2013.01)

(58) Field of Classification Search
CPC .................................................. A61K 38/014
See application file for complete search history.

(56) References Cited

U.S. PATENT DOCUMENTS

| 6,992,172 B1 * | 1/2006 | Chang ..................... C08L 89/06 435/325 |
| 2003/0064074 A1 * | 4/2003 | Chang ..................... A61K 8/65 424/184.1 |
| 2014/0193463 A1 * | 7/2014 | Hsu ..................... C07K 5/1008 424/400 |

FOREIGN PATENT DOCUMENTS

| EP | 1 829 946 | 9/2007 | |
| NL | 2013880 B1 * | 10/2016 | ............. A61L 24/08 |
| WO | 2016/085345 | 6/2016 | |

OTHER PUBLICATIONS

Petsch et al. (2000) Endotoxin removal from protein solutions, J. Biotechnol., vol. 76, pp. 97-119.*
International Search Report, International Patent Application No. PCT/EP2018/082238, dated Dec. 17, 2018, 3 pages.

* cited by examiner

*Primary Examiner* — David Steadman
(74) *Attorney, Agent, or Firm* — Casimir Jones, S.C.; Tanya A. Arenson

(57) ABSTRACT

Described is a method for the preparation of a gelatin hydrolysate having a decreased endotoxin content, comprising the steps of incubating a solution of gelatin of gelatin hydrolysate at a temperature of 70-125° C. at a pH of 3.5 or less for a time period of at least 15 minutes, and recovering the gelatin hydrolysate. Further a gelatin hydrolysate thus obtained is described.

9 Claims, 3 Drawing Sheets

METHOD FOR THE PREPARATION OF GELATIN HYDROLYSATE HAVING A LOW ENDOTOXIN CONTENT

This application is a national phase application under 35 U.S.C. § 371 of PCT International Application No.: PCT/EP2018/082238, filed on Nov. 22, 2018, which claims the benefit of EP Patent Application No. 17203341.7, filed Nov. 23, 2017, the contents of each of which are incorporated by reference herein.

The invention relates to a method for the preparation of gelatin hydrolysate having a low lipopolysaccharide (LPS) content and to gelatin hydrolysate having a low lipopolysaccharide content.

Gelatin is a mixture of water-soluble proteins derived from collagen. Gelatin is obtained e.g. by partial hydrolysis of collagen, obtained by aqueous extraction of skin, tendons, ligaments, bones etc. in acid or alkali conditions, or by enzymatic hydrolysis. Gelatin obtained by acid treatment is called Type A gelatin, whereas Type B gelatin is derived from alkali based process.

Gelatin does not constitute a uniform protein molecule, but comprises a variable amount of protein molecules of variable length, having an average molecular weight of up to 200-250 kDa. Therefore, the molecular weight distribution of gelatin is an important parameter responsible for or determining often critical and important gelatin properties such as viscosity and bloom value, or gel strength.

Gelatin forms a thermoreversible gel at room temperature, and dissolves in hot water. Gelatin is commonly used in diverse industries, for example in food, pharmaceuticals and cosmetics applications, among others as gelling agent and texturizer in e.g. fruit gums and gelatin desserts, but also finds application in de medical field, e.g. for plasma substitution and gelatin based implants.

The molecular weight varies among others due to different extraction temperatures and conditions. As a result also bloom and viscosity will vary. Temperature is an important parameter in gelatin preparation, e.g. purification conditions before the gelatin can be applied in food, pharmaceutical, technical and medical applications and often needs careful control. When it comes to use of gelatin, in applications where gelling characteristics and viscosity are important, a temperature of 60° C. is considered as maximum handling temperature, although temperatures of up to e.g. 62° C. or 65° C. for a limited time period of e.g. 5 or 10 to 30 or 45 min. may be acceptable under circumstances when some loss of gelling capacity and/or viscosity is tolerated.

The molecular weight distribution of gelatin is usually measured by size exclusion HPLC (high performance liquid chromatography) techniques, and eluted fractions are detected by UV adsorption and the measured data are evaluated by suitable software, all techniques, known in the art, see e.g. Olijve et. al., Journal of Colloid and Interface Science (2001) 243, 476-482. For hydrolysed gelatins with an average molecular weight smaller than 70 kDa, such as smaller than 20 kDa, the same method can be used, but it preferred to use a separation column, such as TSKgel2000SWXL (Tosoh BioScience, Japan), to obtain high resolution (Zhang et. al., Food Hydrocolloids 23 (2009) 2001-2007).

Viscosity of gelatin (the dynamic viscosity) is usually measured by measuring the flow time of a 6.67 w/w % solution of gelatin through a standard flow pipet at 60° C., see GME Monograph Standardized Methods for the testing of Edible Gelatin, version 10, 2014 (GME, Brussels, Belgium), herein also referred to as 'GME10', chapter 2.4.2, p. 81-86.

The gel strength of a 6.67 w/w % gelatin gel can be determined by standardized apparatuses (see GME10), such as a QTS 25 Texture Analyzer (Brookfield Viscometers) or a Texture Analyzer TA-XT2 (Stable Micro Systems Ltd., London, United Kingdom), and is indicated by a bloom number (also referred herein as 'bloom value', see GME10).

At temperatures above 65° C., in particular above 70° C., hydrolysis of gelatin occurs, i.e. breakdown of protein molecules to smaller peptides, resulting in a lower gel strength or even loss of gelling capacity. The same occurs at low pH. Accordingly, so-called 'hydrolysed gelatin' is a peptide preparation originating from hydrolysis of gelatin to peptide molecules having an average molecular weight of 70 kDa or less, usually 20 kDa or less, usually between 100 and 15000 Da. Because of the relatively small molecules, hydrolysed gelatin has no gelling properties, i.e. not capable of gel formation when kept at 0° C. for 6 hours (Pharmacopeia definition). Hydrolysed gelatin is e.g. used as texture conditioner and moisturizer in topical crèmes, and is also used in nutritional products because of the high glycine, proline and hydroxyproline content and is associated with health effect and it is more and more used for biomedical applications. It is also named 'hydrolysed collagen', as collagen is first hydrolysed to gelatin and then further to the non-gelling hydrolysate. Gelatin hydrolysate is usually prepared by enzymatic hydrolysis of gelatin.

There is an increasing need for gelatin hydrolysate that can be used for biomedical purposes, i.e. having a low endotoxin content. In gelatin preparation processes, raw materials are often contaminated by bacteria and as a result, common gelatin preparations can comprise lipopolysaccharides (LPS).

Lipopolysaccharides are found in the outer membrane of Gram-negative bacteria and are potential toxins. LPS are also known as "endotoxins" as lipopolysaccharides are not secreted by bacteria but are part of the membrane structure. Lipopolysaccharides are therefore mainly released after death and lysis of the bacterial cell.

LPS consist of a variable polysaccharide chain and a lipid moiety, lipid A. LPS molecules are about 10 kDa in size, but can form large aggregates in aqueous media, also named "micelles" having a molecular weight of up to 1000 kDa.

LPS are toxic to most mammals and the animal host will often suffer from a wide spectrum of non-specific pathophysiological reactions, such as fever, tachycardia, organ dysfunction and even death.

Although a certain LPS content can be tolerated in many applications of gelatine hydrolysates, specific applications, in particular in medicine, such as for injectables, vaccines and parenterals, the endotoxin level should preferably be lower than 20, more preferably 10 EU/g, even more preferably less than 6, 5, or even less than 4 EU/g. For example USA governmental regulations of the Food and Drug Administration (FDA) allow a maximum of 0.5 EU/ml or 20 EU/device for products that are in contact with the cardiovascular and/or lymphatic system. For devices in contact with cerebrospinal fluid the limit is even 0.06 EU/ml or 2.15 EU/device (~2 EU/g gelatin). For devices that are in direct or indirect contact with the intraocular environment an even lower endotoxin limit may apply.

The Limulus assay (LAL) is a well-known bioassay in the art to measure up to sub-picogram quantities of LPS. Limulus amoebocyte lysate (LAL) is an aqueous extract of blood cells (amoebocytes) from the horseshoe crab, Limulus

*polyphemus*. LAL reacts with bacterial endotoxin or lipopolysaccharide (LPS), which is a membrane component of Gram negative bacteria. This reaction is the basis of the LAL test, which is then used for the detection and quantification of bacterial endotoxins. A US-FDA, USP 2011, chapter <85> accepted recommended LAL method to quantify the LPS levels is the chromogenic Endosafe method, e.g. from Charles River USA. Other accepted and recommended methods are the EndoZyme recombinant factor C method from Hyglos GmbH (Germany). Both said methods result in similar or identical measurement values and can therefore be used interchangeably.

WO 2009/154440 describes a method for the removal of LPS from a gelatin source wherein the initial endotoxin level of 13,200 EU/g is decreased $10^{21}$ fold, i.e. to a value of 105 EU/g. Although this decrease is significant, the levels are still unacceptably high for medical purposes. According to WO 2009/154440, a 30 w/w % aqueous gelatin solution was heated to 90° C. in the presence of TRITON X-100 surfactant, i.e. to above the cloud-point of TRITON X-100 surfactant (68-69° C.), resulting in the loss of solubility and aggregation of the surfactant and thereby in a 3 phase extraction process wherein both aggregated surfactant as well as the LPS, bound to the adsorbent are removed from the aqueous phase comprising purified gelatine by centrifugation. Because of the temperature of 90° C., significant hydrolysis of the gelatin must have resulted in a significant decrease in molecular weight of the initial gelatin, and an intrinsic loss of functionality such as viscosity and gel strength. In the method of WO2009/154440 it is critical that the solution is brought to conditions such, that the temperature of the solution comprising the gelatin, surfactant, adsorbent and the LPS is above the cloud point temperature of the surfactant at that conditions, in order to allow the surfactant to aggregate so that the aggregates can be removed, together with the LPS adsorbed to the adsorbent, by centrifugation.

The use of a surfactant, adsorbent and laborious centrifugation steps, while not arriving at low levels of endotoxin that would make the hydrolysate interesting for medical applications, resulted in the need to provide a new preparation method for gelatin hydrolysate with a lower endotoxin content.

To this end, the present disclosure provides a method for the preparation of a gelatin hydrolysate having a decreased endotoxin content, comprising the steps of:
 a. incubating a solution of gelatin of gelatin hydrolysate at a temperature of 70-125° C. at a pH of 3.5 or less for a time period of at least 15 minutes, and
 b. recovering the gelatin hydrolysate.

The term 'decreased endotoxin content' intends to mean that the endotoxin level of the gelatin hydrolysate of step b., is significantly lower than that of the starting material, i.e. the gelatin or the gelatin hydrolysate before being subjected to step a. The level is preferably at least 10 times lower, more preferably at least 100 times lower, more preferably at least 500 times lower or even 700 times lower, more preferably 1000 times or even 5,000 times, or even 10,000 times lower. As will be seen in the examples, a level of 15,000 times lower can be achieved.

The temperature is between 70 and 125° C., wherein it is to be understood that at temperatures above 100° C., the heating takes place under pressure. Therefore, the temperature is preferably between 80° C. and 100° C., more preferably between 90 and 100° C.

The pH is 3.5 or lower, and the time period is preferably at least 15 minutes. I will be clear for the skilled person that a higher temperature allows for a shorter incubation period.

The incubation period is chosen such, that the envisaged endotoxin content is reached, while providing a gelatine hydrolysate of the envisaged properties like molecular weight distribution and average molecular weight. The skilled person will readily adjust the parameters of temperature, pH and time to arrive at the envisaged hydrolysate having the required low endotoxin content.

As will be shown in the examples, and readily understood by the skilled person, that a higher temperature allows for a less pH reduction and/or a shorter time period, and vice versa, i.e. a lower pH allows for a lower temperature and/or a shorter time period. In view of the above, the temperature is preferably between 92-98° C., more preferably between 94-96° C., while the pH is preferably 3.0 or less, more preferably 2.7 or less, more preferably 2.5 or less, even more preferably between 1.8-2.2, and most preferably about 2.0. The term 'about' intends to mean that the pH may vary around the value of 2.0, by 0.5 or less, i.e. between 1.5-2.5, or preferably 1.7-2.3, even more preferably 1.9-2.1. It is however to be understood that at the preferred lower pH ranges of e.g. 2.5 or less, a temperature of 70° C. to 80° C. will result in attractive LPS removal, without the need to heat any further. Further heating can be desired to decrease the LPS content even further. On the other hand, at the higher preferred temperature ranges of e.g. 90° C. or higher, the pH may be chosen in the upper limits as described, e.g. having a value of 3-3.5. Further lowering of the pH can be desired to decrease the LPS content even further.

The time period is preferably 30 minutes or more. In that period, the gelatin hydrolyses at such high temperatures and the endotoxin levels will be attractively low. The time period is 1-5 hours, preferably 1.5-3 hours, more preferably 2-2.5 hours.

In a very attractive embodiment, the method is free of an enzymatic treatment step. In present methods for the preparation of gelatin hydrolysis, often enzymes are used, which need to be inactivated and might also require subsequent purification of the hydrolysate, as any foreign protein material such as such enzymes may cause an immune response. By using the unusual harsh temperature and pH conditions, it was found that hydrolysis takes place without the need for enzyme involvement. So the product is preferably enzyme-free.

Although the method can start with a gelatin hydrolysate, it is preferred to incubate a gelatin solution in step a, that has a molecular weight of more than 70 kDa. As the method conditions have hydrolyzing power for the gelatin, it is not necessary to hydrolyze the gelatin in a preceding step.

The gelatin hydrolysate in step b. preferably has a molecular weight of 30 kDa or less, preferably of 20 kDa or less, more preferably of 10 kDa or les, even more preferably of 5 kDa or less, or even 4 kDa or less. As discussed above, the gelatine hydrolysate has no gelling power.

The gelatin hydrolysate in step b. preferably has an endotoxin level of 20 EU/g gelatin hydrolysate or less, preferably of 10 EU/g or less, more preferably of 5 EU/g or less, even more preferably of 2 EU/g or less, most preferably of 1 EU/g or less. Such values can be obtained with gelatin starting materials having 10,000-15,000 EU/g gelatin or more.

Further described is a gelatin hydrolysate, obtainable by the method of any of the preceding claims. Such gelatin hydrolysate preferably has a molecular weight of 20 kDa or less, preferably of 15 kDa or less, and an endotoxin level of 20 EU/g gelatin hydrolysate or less, preferably of 10 EU/g or less, more preferably of 5 EU/g or less, even more preferably of 2 EU/g or less, most preferably of 1 EU/g or less, in particular measured according to the above-described LAL method.

The disclosure will be further illustrated by the following examples and figures.

EXAMPLE 1

Effect of Temperature and pH on Endotoxin Levels in Gelatine Hydrolysate

Temperatures varied from 60, 70, 80, 90, and 95° C., pH values were 2, 2.5, 3, '5'(unchanged), Hydrolysis was performed up to 3 hours.

Gelatin used: #140P117162B1, pig skin gelatin type A, Rousselot, Ghent, Belgium (high bloom, a molecular weight (MW) of 150 kDa, having an endotoxin content of 14000 EU/g).

For each hydrolysis temperature/pH value, 20 g gelatin was dissolved in 180 g water by heating at 55° C. for at least 30 min to prepare 200 g of a 10% gelatin solution. It is also possible to prepare a solution having a lower or higher gelatin concentration.

Samples of 10 g were taken and these were put in to a water bath that has the correct hydrolysis temperature until the solution reached this temperature (±3° C.).

For pH analysis, a 5M $H_2SO_4$ solution was used; the needed amounts of acid per pH were been determined with the aid of a titration curve.

Take samples were incubated for 0.1-0.5-1-1.5-2-3 h.

At the end of the envisaged incubation period, 10M NaOH was admixed to bring the sample pH to 4.9 with the aid of a titration curve, as outlined in table 1, and the samples were kept in the freezer at −20° C. until the endotoxin level was measured.

TABLE 1 titration values for NaOH addition

| pH | 10M NaOH [μL] |
|---|---|
| 2 → ~4.9 | 19.3 |
| 2.5 → ~4.9 | 14.8 |
| 3 → ~4.9 | 11.8 |
| 4 → ~4.9 | 5.9 |

For the measurements of endotoxin level, the samples were thawed in a 40° C. water bath.

The molecular weight has been measured according to the method described by Zhang, supra, and is shown in tables 2 and 3.

TABLE 2 molecular weight at 95° C. at different pH

| Time (h) | pH 2.0 and 95° C. MW (Da) | pH 2.5 and 95° C. MW (Da) | pH 2.7 and 95° C. MW (Da) |
|---|---|---|---|
| 0 | 155 | 155 | 155 |
| 1 | 9.5 | 11.8 | 12.0 |
| 2 | 7.0 | 8.8 | 8.5 |
| 3 | 6.4 | 7.4 | 7.5 |
| 4 | 5.4 | 6.7 | 6.7 |

TABLE 3 molecular weight at pH 2.0 at different temperature

| Time (h) | pH 2.0 and 80° C. MW (Da) | pH 2.0 and 90° C. MW (Da) | pH 2.0 and 95° C. MW (Da) |
|---|---|---|---|
| 0 | 150 | 150 | 155 |
| 1 | 13.8 | 9.5 | 9.5 |
| 2 | 12.8 | 7.4 | 7.0 |
| 3 | 11.2 | 6.3 | 6.4 |
| 4 | 10.6 | 5.6 | 5.4 |

The same experiments were performed at a pH of 3, 4, and 5 at a temperature of 121° C. in an autoclave for 20 minutes.

The results are given in the following tables 3—and in FIGS. 1-4

TABLE 3 comparative example at pH 5

| Hydrolysis time [h] | Temp [° C.] | EU/g |
|---|---|---|
| 0 | 95 | 12017 |
| 0 | 80 | 12017 |
| 0 | 60 | 10834 |
| 3 | 60 | 7723 |
| 1 | 80 | 5421 |
| 2 | 80 | 7671 |
| 3 | 80 | 7371 |
| 1 | 90 | 7082 |
| 2 | 90 | 8000 |
| 3 | 90 | 7812 |
| 1 | 95 | 6520 |
| 2 | 95 | 6562 |
| 3 | 95 | 6323 |
| 0.33 | 121 | 4240 |

At a pH of 5, no significant endotoxin removal could be observed. See also FIG. 1.

TABLE 4 endotoxin levels at pH of 2

| Hydrolysis time [h] | Temp [° C.] | EU/g |
|---|---|---|
| 0.1 | 60 | 10000 |
| 1 | 60 | 5853 |
| 3 | 60 | 5285 |
| 0.1 | 70 | 9990 |
| 1 | 70 | 5084 |
| 3 | 70 | 825 |
| 0.1 | 80 | 10446 |
| 0.5 | 80 | 7911 |
| 1 | 80 | 4214 |
| 2 | 80 | 1875 |
| 3 | 80 | 731 |
| 1 | 90 | 751 |
| 2 | 90 | 67 |
| 3 | 90 | 13 |
| 0.1 | 95 | 6586 |
| 0.5 | 95 | 220 |
| 1 | 95 | 10 |
| 2 | 95 | 4 |
| 3 | 95 | 3 |
| 0.33 | 121 | 1 |

See also FIG. 2. It can be seen that at 90 and 95° C., as well as at 121° C., low endotoxin levels were obtained to attractive values

TABLE 5

| Endotoxin levels at pH of 3 | | |
|---|---|---|
| Hydrolysis time [h] | Temp [° C.] | EU/g |
| 0.1 | 70 | 8900 |
| 0.5 | 70 | 5148 |
| 1 | 70 | 5708 |
| 3 | 70 | 5222 |
| 0.1 | 80 | 7359 |
| 0.5 | 80 | 5693 |
| 1 | 80 | 5024 |
| 3 | 80 | 1858 |
| 0.1 | 95 | 5924 |
| 0.5 | 95 | 1032 |
| 1 | 95 | 92 |
| 3 | 95 | 7 |
| 0.33 | 121 | 3 |

See also FIG. 3. Again, at a pH of 3 and a temperature of above 90° C., such as 95° C., envisaged endotoxin levels are observed.

TABLE 6

| Endotoxin levels at a pH of 2.5 and a temperature of 95° | | |
|---|---|---|
| Hydrolysis time [h] | EU/g | MW[kDa] |
| 0 | 13919 | 150 |
| 0.25 | 7960 | |
| 1 | 14.5 | 4534 |
| 3 | <4 | 7.4 |
| 4 | <4 | 6.7 |
| 4.5 | <4 | 6.5 |
| 5 | <4 | 6.3 |
| 6 | <4 | 6.0 |
| 7 | <4 | 5.7 |

From table 6, the data are also shown in FIG. 4, it can be observed that the gelatin becomes hydrolysed to a molecular weight of below 4000 Da, while the endotoxin level is below 10 EU/g after more than an hour incubation time.

In addition to the above data at 121° C. at pH values of 2, 3 and 5 and an incubation period of 20 minutes, also a measurement at pH 4 was taken, resulting in a value of 164 EU/g. The data are summarized in FIG. 5, showing attractive result at a pH value of 3.

Similar results were obtained for type B gelatin.

Figure 1:
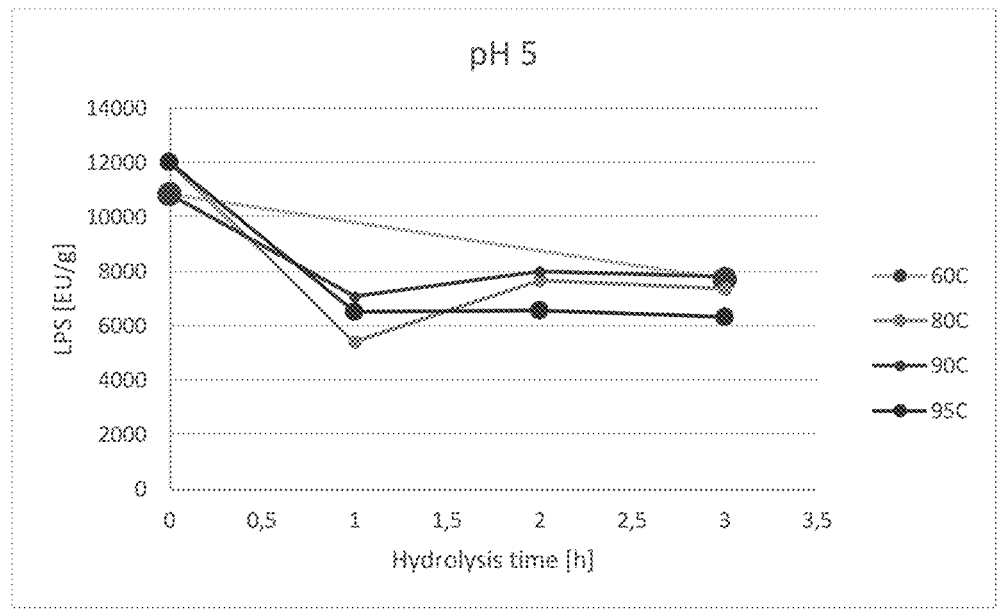
FIG. 1 shows hydrolysis time for gelatin hydrolysates at pH 5.
Figure 2:
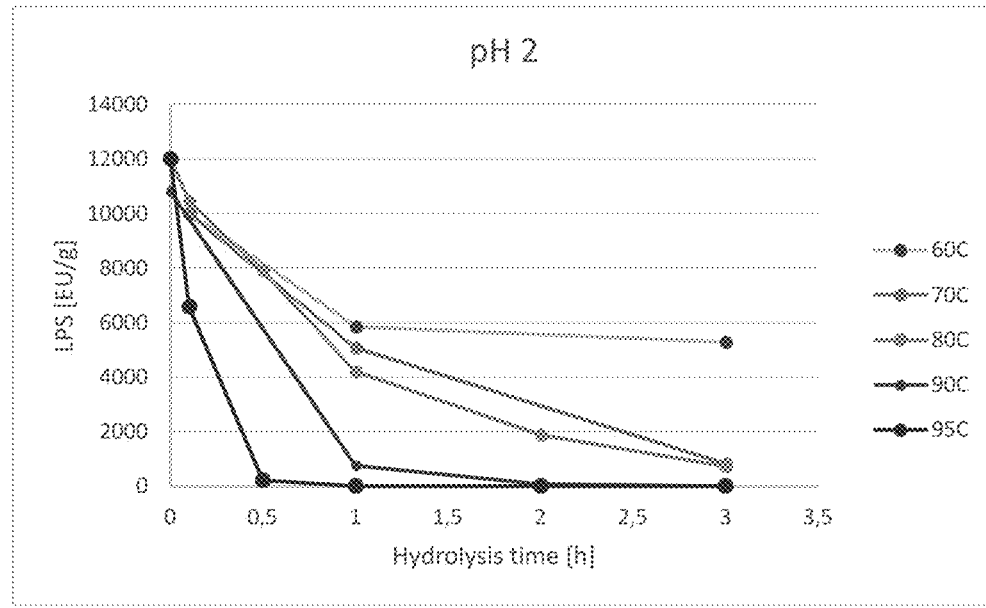
FIG. 2 shows hydrolysis time for gelatin hydrolysates at pH 2.
Figure 3:
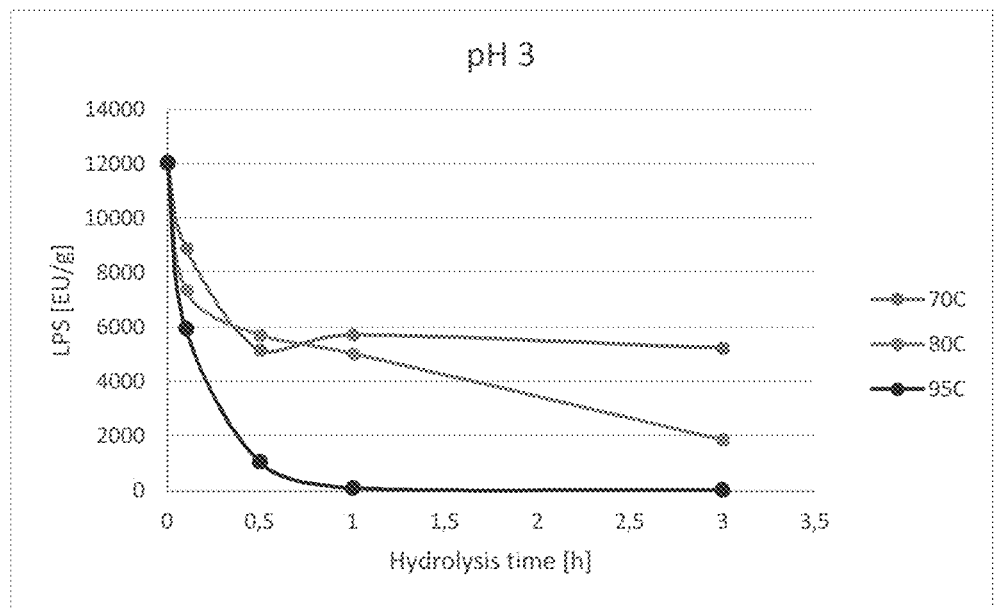
FIG. 3 shows hydrolysis time for gelatin hydrolysates at pH 3.
Figure 4:
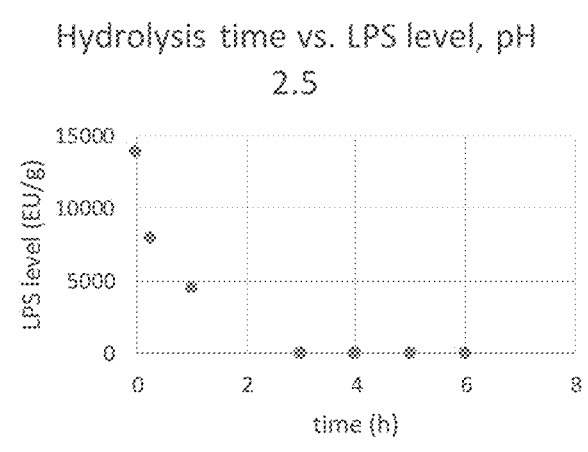
FIG. 4 shows hydrolysis time vs. LPS level at pH 2.5
Figure 5:
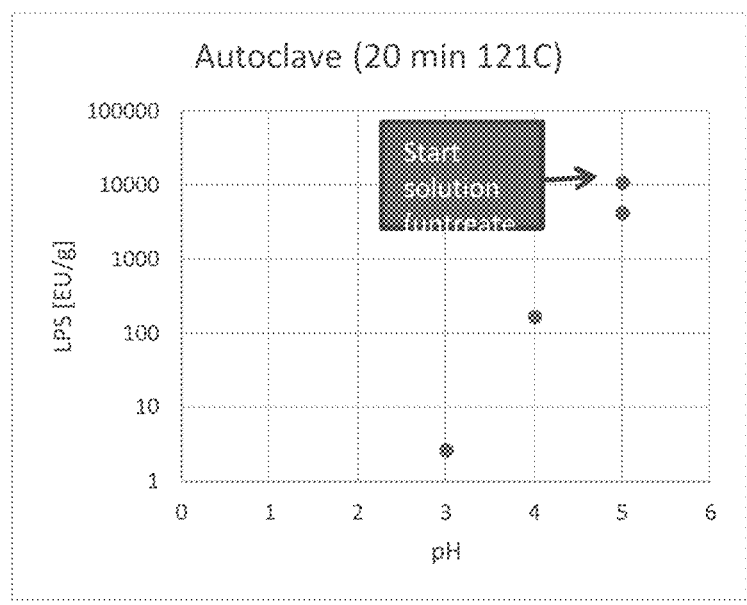
FIG. 5 shows LPS levels at different pH values.

The invention claimed is:

1. A method for the preparation of a gelatin hydrolysate having a decreased endotoxin content, comprising the steps of:
    a) incubating a solution of gelatin or gelatin hydrolysate at a temperature of 80-96° C. at a pH of 3.5 or less for a time period of at least 15 minutes, and
    b) recovering the gelatin hydrolysate having a decreased endotoxin content,
    wherein in the method, no surfactant is added to the gelatin or gelatin hydrolysate.

2. The method of claim 1, wherein the pH is 2.7 or less.

3. The method of claim 1, wherein the pH is 3.0 or less.

4. The method of claim 1, wherein the time period is 30 minutes or more.

5. The method of claim 4, wherein the time period is 1-5 hours.

6. The method of claim 1, being free of an enzymatic treatment step.

7. The method of claim 1, wherein in step a) the gelatin or gelatin hydrolysate has a molecular weight of more than 70 kDa.

8. The method of claim 1, wherein the gelatin hydrolysate of step b) has a molecular weight of 30 kDa or less.

9. The method of claim 1, wherein the gelatin hydrolysate of step b) has an endotoxin level of 20 EU/g gelatin hydrolysate or less.

* * * * *